United States Patent
Hirose et al.

(10) Patent No.: US 8,250,005 B2
(45) Date of Patent: Aug. 21, 2012

(54) CHANGE-POINT DETECTING METHOD AND APPARATUS

(75) Inventors: Shunsuke Hirose, Minato-ku (JP); Kenji Yamanishi, Minato-ku (JP)

(73) Assignee: NEC Corporation, Tokyo (JP)

( * ) Notice: Subject to any disclaimer, the term of this patent is extended or adjusted under 35 U.S.C. 154(b) by 623 days.

(21) Appl. No.: 12/523,412

(22) PCT Filed: Jan. 16, 2008

(86) PCT No.: PCT/JP2008/050423
§ 371 (c)(1),
(2), (4) Date: Jul. 16, 2009

(87) PCT Pub. No.: WO2008/087968
PCT Pub. Date: Jul. 24, 2008

(65) Prior Publication Data
US 2010/0100511 A1    Apr. 22, 2010

(30) Foreign Application Priority Data
Jan. 17, 2007   (JP) .................................. 2007-008027

(51) Int. Cl.
*G06F 15/18* (2006.01)
(52) U.S. Cl. ......................................................... 706/12
(58) Field of Classification Search ........................ None
See application file for complete search history.

(56) References Cited

U.S. PATENT DOCUMENTS
2004/0167893 A1    8/2004  Matsunaga et al.
2005/0278613 A1*  12/2005  Morinaga et al. ............. 715/500

FOREIGN PATENT DOCUMENTS
| JP | 11-275437 A | 4/2001 |
| JP | 2004-054370 A | 2/2004 |
| JP | 2004-309998 A | 11/2004 |
| JP | 2005-258599 A | 9/2005 |

OTHER PUBLICATIONS

Giordani et al. "Efficient Bayesian Inference for Multiple Change-Point and Mixture Innovation Models", Sveriges Riksbank Working Paper Series, 2006, pp. 39.*
Chib "Estimation and comparison of multiple change-point models", Econometrics 86, 1998, pp. 221-241.*

* cited by examiner

*Primary Examiner* — Alan Chen
*Assistant Examiner* — Li-Wu Chang
(74) *Attorney, Agent, or Firm* — Sughrue Mion, PLLC

(57) ABSTRACT

To detect a statistical change-point that appears in time-series data with a high accuracy. A first model learning section 102 learns the occurrence probability distribution of time-series data 111 as a first statistical model (for example, a latent Markov model) defined by a finite number of variables including a latent variable. In the subsequent processing, the degree of a temporal change in the probability distribution is computed for each of the probability distribution of the entire first statistical model, its partial probability distribution (the probability distribution of the latent variable and conditional probability distribution contingent on the value of the latent variable), and the probability distribution in which the above plural probability distributions are linearly-combined with a weight. The change-point of the time-series data 111 is detected on the basis of the computed degree of the change.

19 Claims, 8 Drawing Sheets

US 8,250,005 B2

CHANGE-POINT DETECTING METHOD AND APPARATUS

TECHNICAL FIELD

The present invention relates to a data mining technique and, more particularly, to a method and an apparatus for detecting a statistical change-point through computing a change degree score for time-series data.

BACKGROUND ART

Patent Document 1 depicts an example of such kind of apparatuses used for general purposes. With this technique, the statistical change-points are detected in a following manner.

First, an occurrence probability distribution of sequentially inputted data series is learned as a first statistical model that is defined by a finite number of variables. Then, an outlier score showing a degree of difference between actual data and data predicted from the learned first statistical model for each data in the data series, and computes the moving average of the outlier scores.

Thereafter, an occurrence probability distribution of the moving average series of the outlier scores is learned as a second statistical model that is defined by a finite number of variables. Each moving average outlier score is computed based on the learned second statistical model and the moving average of the outlier scores, and it is outputted as a change-degree score of the original data. Then, the change-degree score is compared with a threshold value to detect a change-point.

Patent Document 1: Japanese Unexamined Patent Publication 2004-54370

The above-described technique is a technique that is effective in respect that it is designed to treat the outlier detection and the change-point detection uniformly in a same frame. However, this technique is not mainly directed to improve the change-point detection accuracy.

In many cases, a point where there is a relatively large change in the probability distribution of the first statistical model is a change point to be detected. However, there are cases where a point where there is no significant change in the probability distribution of the first statistical model is the change-point to be detected. In that case, a detection failure occurs. Inversely, there are cases where a point where there is relatively a large change in the probability distribution of the first statistical model is a change-point that is not to be detected. In that case, a misdetection occurs. In the field of data mining, detection of change-points has drawn an attention in association with detection of trend changes and behavior monitoring, and it is expected to improve the detection accuracy thereof still further.

An object of the present invention is to prevent a detection failure and a misdetection in a method and an apparatus for detecting a statistical change-point appeared in time-series data.

DISCLOSURE OF THE INVENTION

In order to achieve the foregoing object, the change-point detecting apparatus according to the present invention is a change-point detecting apparatus for detecting a statistical change-point of data. The change-point detecting apparatus includes: a first model learning section which learns an occurrence probability distribution of data as a statistical model that is defined by a finite number of modifications containing a latent variable, and estimates a probability distribution of the statistical model, a probability distribution of a latent variable and a conditional probability distribution as a partial distribution thereof; a second model learning section which finds a change degree for each of the estimated probability distributions; and a change-point detecting section which detects a change-point appeared in the data based on the obtained change degrees of each of the probability distributions.

The change-point detecting method according to the present invention is a change-point detecting method for detecting a statistical change-point of data. The change-point detecting method includes: learning an occurrence probability distribution of data as a statistical model that is defined by a finite number of modifications containing a latent variable, and estimating a probability distribution of the statistical model, a probability distribution of a latent variable and a conditional probability distribution as a partial distribution thereof; finding a change degree for each of the estimated probability distributions; and detecting a change-point appeared in the data based on the obtained change degrees of each of the probability distributions.

The change-point detecting program according to the present invention is a change-point detecting program for detecting a statistical change-point of data. The change-point detecting program enables a computer to execute: a function which learns an occurrence probability distribution of data as a statistical model that is defined by a finite number of modifications containing a latent variable, and estimates a probability distribution of the statistical model, a probability distribution of a latent variable and a conditional probability distribution as a partial distribution thereof; a function which finds a change degree for each of the estimated probability distributions; and a function which detects a change-point appeared in the data based on the obtained change degrees of each of the probability distributions.

(Effects)

The function showing the occurrence probability distribution learned as the first statistic model defined by a finite number of variables including a latent variable can be separated into a part regarding the latent variable and a part other than that part. In terms of the probability distribution, a function part regarding the latent variable shows the probability distribution of the latent variable, and the other function part shows a conditional probability distribution contingent on the value of the latent variable. When the change degree of the probability distribution of the latent variable, the change degree of the conditional probability distribution, and the change degree of the linearly combined probability distribution of those plurality of probability distributions with a weight are calculated and used for detection of the change-point in addition to using the change degree of the entire original probability distribution, it is possible to set the detecting condition more delicately than the case of detecting the change-point based only on the change degree of the entire probability distribution. Further, when a posteriori probability distribution is used further as the probability distribution calculated from the first statistic model, the detecting condition can be set in a still more delicate manner.

With the present invention, it is possible to improve the accuracy for detecting the statistical change-point appeared in time-series data. This can be achieved because it is possible to compute, in addition to the change degree of the entire probability distribution, the change degree of a part of the probability distribution as a structural component thereof and the change degree of the linearly combined probability distribution of those plurality of probability distributions with a weight to be used for detecting the change-point. Therefore, the detecting condition can be set more delicately than the case of detecting the change-point based only on the change degree of the entire probability distribution. As a result, omission of detections can be suppressed, so that misdetection can be reduced.

Particularly, through computing the change degree of the latent variable that is the amount not directly observed, it is possible to present to a user the information that cannot be seen when seeing the change in the entire probability distribution or when seeing the occurrence probability in the probability distribution of the appeared data, and to use the information for detecting the change-point. The information that cannot be seen in the other cases herein may be the change in the way of transition in the observed value (It is not the change in the frequency. In cases of a language, this corresponds to seeing only the change in the grammar but not seeing the change in the types of the words to be used, for example), etc., even though it depends on the statistic models used for learning the probability distributions.

BEST MODES FOR CARRYING OUT THE INVENTION

Next, exemplary embodiments of the invention will be described in detail by referring to the drawings.

(First Exemplary Embodiment)

Referring to FIG. 1, a change-point detecting device according to a first exemplary embodiment of the invention has: a data processor 100 operated by a program control; an input data storage section 110 configured with a magnetic disk, a semiconductor memory, or the like; a condition storage section 120; a first learning result storage section 130; a distance storage section 140; a second learning result storage section 150; a score storage section 160; an input device 170 configured with a keyboard and the like; a display device 180 configured with a liquid crystal display or the like.

The input data storage section 110 stores time-series data 111 that is a target of detecting a change-point. The time-series data 111 may be a discrete-value change amount or a continuous-value change amount, or may also be a mixture of those.

The condition storage section 120 stores a condition 121 of change-point detection processing. The condition 121 contains: (a) a combination factor which gives a weight of each probability distribution when linearly combining a plurality of probability distributions; and (b) a change-point detecting condition. The change-point detecting condition sets the way of combining a plurality of kinds of score series, and what kinds of threshold values to be used.

The first learning result storage section 130, the distance storage section 140, the second learning result storage section 150, and the score storage section 160 temporarily store a first learning result 131, distance computation results 141-144, second learning results 151-154, and score computation results 161-164, which are generated in the change-point detection processing executed by the data processor 100, respectively.

The input device 170 receives various setting instructions and data from a user, and inputs those to the data processor 100.

The display device 180 visualizes the data outputted from the data processor 100 and displays it to the user. The display device 180 is used herein as an example of the device for outputting the processed results and the like to the user. However, other kinds of output devices such as a printer may be employed as well.

The data processor 100 detects a statistical change-point by analyzing the time-series data 111 stored in the input data storage section 110 according to a setting instruction inputted from the input device 170, and displays the detection result and the data that is in the analyzing process on the display device 180. The data processor 100 has a data input section 101, a first model learning section 102, a distribution-to-distribution distance computing section 103, a second model learning section 104, a change-degree score computing section 105, a distribution change output section 106, a change-point detecting section 107, and a condition input section 108. Theses devices have following functions, respectively.

The data input section 101 receives inputs of the time-series data 111 from the input data storage section 110, and transmits the data to the first model learning section 102.

The first model learning section 102 learns the occurrence probability distribution of the time-series data 111 as the first statistical model that is defined by a finite number of variables including a latent variable, and stores the learning result 131 thereof to the storage section 130. The first learning result 131 contains the time-series data of the value of the finite number of variables which define the first statistical model.

The distribution-to-distribution computing section 103 reads out the learning result 131 of the first statistical model from the first learning result storage section 130, computes distances between the probability distributions at different time for each of the probability distributions of the entire first statistical model, a part of the probability distributions, and the probability distributions obtained by linearly combining a plurality of those probability distributions, and saves the result to the distance storage section 140 as the data series of the distances between each of the probability distributions. In the case of this embodiment, the distribution-to-distribution distance computing section 103 generates the data series of following four distances.

(1) Time-series data of results obtained by computing distances between probability distributions at different times for the probability distributions of the entire first statistical model (distance computation result 141).

(2) Time-series data of results obtained by computing the distances between probability distributions at different times for the probability distributions of the latent variable (distance computation result 142).

(3) Time-series data of results obtained by computing the distances between probability distributions at different times for the conditional probability distributions of observed values contingent on the latent-variable value (distance computation result 143).

(4) Time-series data of results obtained by computing the distances between probability distributions at different times for the probability distributions obtained by linearly combining the probability distributions of the entire first statistical model, the probability distributions of the latent variable, and the conditional probability distributions of the observed values (distance computation result 144). For the combination factors defining the weights of each probability distribution, the combination factors read out from the condition storage section 120 are used.

The second model learning section 104 reads out the distance computation results 141-144 from the distance storage section 140, learns the occurrence probability distributions of the distance data series for each of the distance computation results 141-144 as a second statistical model that is defined by a finite number of variables, and saves the learning results 151-154 thereof to the second learning result storage section 150. Each of the second learning results 151-154 contains the time-series data of the finite-number variable value that defines the second statistical model. The second model learning section 104 and the first model learning section 102 are both the model leaning sections. However, those are different in respect that the first model learning section 102 is the learning section which estimates the probability distributions of the time-series data 111, while the second model learning section 104 is the learning section which finds the change degrees of the estimated probability distributions.

The change-degree score computing section 105 reads out the distance computation results 141-144 from the distance storage section 140, reads out the second learning results 151-154 from the second learning result storage section 150, computes the change-degree scores showing the degrees of shift between the actual distance values and the values expected from the second statistical model for each of the distance data series of each probability distribution, and saves those to the score storage section 160 as the score computation results 161-164. The score computation results 161-164 contain the time series data of the change-degree score values.

The distribution change output section 106 reads out at least either the distance computation results 141-144 stored in the distance storage section 140 or the score computation results 161-164 stored in the score storage section 160, and displays those on the display device 180 in a form of a graph so that changes in those values in terms of time can be visually recognized.

The change-point detecting section 107 reads out the score computation results 161-164 from the score storage section 160, reads out the change-point detecting condition 121 from the condition storage section 120, detects the change-point appeared in the time-series data of the score computation results 161-164 based on the detecting condition, and displays the detected result on the display device 180.

The condition input section 108 receives the condition 121 of the change-point detection processing from the user via the input device 170 and the display device 180, and saves it to the condition storage section 120.

Next, operations of the change-point detecting apparatus according to the exemplary embodiment will be described.

When the user inputs a change-point detecting instruction from the input device 170, the data processor 100 starts to execute the processing shown in FIG. 2.

First, the condition input section 108 of the data processor 100 receives an input of the change-point detection processing condition 121 from the user, and saves it to the condition storage section 120 (S101).

FIG. 3 shows an example of a condition setting screen that is displayed on the display device 180 by the condition input section 108. In the drawing, reference numerals 201-203 are input sections of combination factors $c_1$, $c_2$, and $c_3$ when linearly combining a plurality of probability distributions, and "$c_1$" is a weight of the entire probability distribution of the first statistical model, "$c_2$" is a weight of the probability distribution of the latent variable, and "$c_3$" is a weight of the conditional probability distribution. Further, reference numerals 204-207 are selecting sections of the score series to be used, 208-211 are input sections of threshold values to be compared with the data of the selected score series, 212, 213 are sections for selecting the combination of a plurality of score series to be AND (logical product) or OR (logical sum).

For example, when it is desired to detect the change-point based on the change in the probability distribution obtained by linearly combining the probability distribution of the first statistical model, the probability distribution of the latent variable, and the conditional probability distribution of the observed value, the user inputs the values of the combination factors $c_1$, $c_2$, and $c_3$ to the input sections 201-203, selects the selection section 207, inputs the threshold value used for judgment to the input section 211, and selects the OR selection section 213. When it is desired to detect a point at which the probability distribution of the first model or the probability distribution of the latent variable exceeds the threshold value as the change-point, the user selects the selection sections 204, 205, inputs the threshold values used for respective judgments to the input sections 208, 209, and selects the OR selection section 213. Further, when it is desired to detect a point at which both the probability distribution of the first model and the probability distribution of the latent variable exceed the threshold value as the change-point, the user selects the selection sections 204, 205, inputs the threshold values used for respective judgments to the input sections 208, 209, and selects the AND selection section 212.

Data inputted via the condition setting screen is saved in the condition storage section 120 by the condition input section 108. The condition setting by the condition input section 108 can be done not only at the start of the change-point detection processing but at any points thereafter. When the condition 121 has already been saved in the condition storage section 120, it is updated to the newly inputted condition.

Then, the first model learning section 102 of the data processor 100 reads out the time-series data 111 in order from the input data storage section 110 via the data input section 101, learns the probability distributions of the time-series data 111 as the statistical model defined by a finite number of parameters, and saves the first learning result 131 including the values of the learned parameters to the first learning result storage section 130 (S102).

For the statistical models learned by the first model learning section 102, used is a model that includes a latent variable in the finite number of parameters which define the probability distributions. For example, it is possible to use a latent Markov model, a mixed distribution, and the like.

Provided here that the latent variable is x ($x_1$, $x_2$, - - - , if there are a plurality of variables), the observed value (time-series data) is y ($y_1$, $y_2$, - - - , if there are a plurality of variables), the probability distribution of the observed value y at time t is pt(y), and the probability distribution of the latent variable x at time t is rt(x), the probability distribution pt(y) of the observed value y at time t is expressed as Expression 1 in a case of a latent Markov model, for example. Note that "$\gamma_t$" is an initial probability of the latent variable, "$a_t$" is a matrix showing transition of the latent variable, and "$b_t$" is the conditional probability distribution of the observed value. In this case, the latent variable shows the manner of transition in the observed value y.

$$p_t(y_1, \ldots, y_n) = \sum_{x_1, \ldots, x_n} \gamma_t(x_1) b_t(y_1 | x_1) \quad \text{(Expression 1)}$$
$$a_t(x_2 | x_1) b_t(y_2 | x_2) \ldots a_t(x_{n-1} | x_n) b_t(y_n | x_n)$$

Further, in a case of the mixed distribution, the probability distribution $P_t(y)$ of the observed value y at time t is expressed as Expression 2. Note that "$q_t(y|x)$" is individual probability distributions which are linearly combined to each other, and "$\gamma_t(x)$" is a combination weight. In this case, the latent variable x shows from which of the distribution among the plurality of distributions the observed value y is generated.

$$p_t(y) = \sum_{x=1}^{n} \gamma_t(x) q_t(y \mid x) \quad \text{(Expression 2)}$$

The first model learning section 102 outputs the learning result for each time t, so that the learning result 131 becomes the time-series data of the learned parameters.

Then, the distribution-to-distribution computing section 103 reads out the first learning result 131 including the parameter learned by the first model learning section 102 from the first learning result storage section 130, computes a moving average of the distances between the probability distributions at different times respectively for the probability distribution $p_t(y)$, one or more probability distributions as structural components of the probability distribution $p_t(y)$, and a linearly-combined distribution of those, and stores the time series of the computed values to the distance storage section 140 for each of the probability distributions (S103).

In the case of this exemplary embodiment, the distribution-to-distribution computing section 103 uses two probability distributions, i.e., the probability distribution of the latent variable and the conditional probability distribution of the observed value contingent on the latent-variable value, as the probability distributions to be the structural components of the probability distribution $p_t(y)$ Thus, the exemplary embodiment computes the moving average of the distances between the probability distributions at different times for the three probability distributions (the probability distribution $p_t(y)$, the probability distribution of the latent variable, and the conditional probability distribution of the observed value) and the probability distribution obtained by linearly combining those distributions, and stores the time series of the computed values to the distance storage section 140 as the distance computation results 141-144. For the distance between the conditional probability distributions of the observed values, the latent-variable value is the condition. Thus, it is an expected value regarding the latent state of the distance between the conditional probability distributions of the observed values.

As the scale for the distance between the probability distributions, it is possible to use an amount showing a difference between the probability distributions (an amount whose value becomes larger as the difference between the probability distributions becomes larger) such as Hellinger distance or KL information amount.

For example, in a case where a latent Markov model is used as the statistical model for learning and KL information amount is used as the distance between the probability distributions, the distribution-to-distribution computing section 103 computes the data as in following Expression 3-Expression 6 for each time t, and outputs those as the distance computation results 141-144. Note here that Expression 3 shows the distance between the probability distributions $p_t(y)$, Expression 4 shows the distance between the probability distributions of the latent variables, Expression 5 shows the expected value regarding the latent state of the distance between the conditional probability distributions of the observed values, and Expression 6 shows the distance between the probability distributions obtained by linearly combining the plurality of those probability distributions with the combination factors $c_1$, $c_2$, and $c_3$. When the combination factors $c_1$, $c_2$, and $c_3$ are not saved in the condition storage section 120, default values may be used or computation of the distance in Expression 6 is omitted.

$$u_{total}^{(t)} = \frac{1}{L} \sum_{j=1}^{L} \sum_{x} \gamma_t(x) \quad \text{(Expression 3)}$$

$$\sum_{x'} \sum_{y} a_t(x' \mid x) b_t(y \mid x) \log\left(\frac{a_t(x' \mid x) b_t(y \mid x)}{a_{t-j}(x' \mid x) b_{t-j}(y \mid x)}\right)$$

$$u_X^{(t)} = \frac{1}{L} \sum_{j=1}^{L} \sum_{x} \gamma_t(x) \sum_{x'} a_t(x' \mid x) \log\left(\frac{a_t(x' \mid x)}{a_{t-j}(x' \mid x)}\right) \quad \text{(Expression 4)}$$

$$u_Y^{(t)} = \frac{1}{L} \sum_{j=1}^{L} \sum_{x} \gamma_t(x) \sum_{y} b_t(y \mid x) \log\left(\frac{b_t(y \mid x)}{b_{t-j}(y \mid x)}\right) \quad \text{(Expression 5)}$$

$$u_w(t) = c_1 u_{total}(t) + c_2 u_X(t) + c_3 u_Y(t) \quad \text{(Expression 6)}$$

The second model learning section 104 reads out the distance computation results 141-144 of the distribution-to-distribution computing section 103 from the distance storage section 140, learns each of the probability distributions of the time-series data contained in each of the distance computation results 141-144, respectively, as the second statistical model defined by a finite number of parameters, and stores the second learning results 151-154 containing the values of the learned parameters to the second learning result storage section 150 (S104).

As the second statistical model to be learned, used is a model which describes developments of the time series. For example, it is possible to use an autoregressive model (AR model). In the autoregressive model, assuming that the value of the time series at time t is $f_t$, the time development is put into a model as in Expression 7, for example, to learn factors $a_1$ and $a_2$. Note that "ξ" is a noise generated randomly.

$$f_t = a_1 * f_{t-1} + a_2 * f_{t-2} + \xi \quad \text{(Expression 7)}$$

The change-degree score computing section 105 reads out the distance computation results 141-144 computed by the distribution-to-distribution computing section 103 from the distance storage section 140 as well as the second learning results 151-154 of the second model learning section 104 from the second learning result storage section 150, computes the change degree of the probability distribution as the score for each of the probability distribution learned by the second model learning section 104, and saves the score computation results 161-164 to the score storage section 160 (S105).

As the score, used is an amount that shows the shift between the value of the time series and the value that is expected from the learned probability distribution. For example, it is possible to use a logarithmic loss of the learned probability distribution of the value of the time series at each time t. In this case, the logarithmic loss is expressed as in Expression 8, provided that the actually observed amount at time t (change amount in the probability distribution) is $z_t$ and the probability distribution of the time series of the change amount in the distribution learned from the amount to $z_{t-1}$ is $p_{t-1}(z)$.

$$\text{Logarithmic loss} = -\log p_{t-1}(z_t) \quad \text{(Expression 8)}$$

In Expression 8, "$p_{t-1}(z_t)$" is the occurrence probability of the amount at the current time with respect to the model of previous time (one time earlier). When the amount at the current time is not shifted from the previous model, the occurrence probability takes a large value. When it is an exceptional amount that is shifted from the previous model, the occurrence probability takes a small value. The value of the logarithmic loss becomes larger when the amount at the current time is more shifted from the model learned previously, since it takes the value obtained by multiplying −1 to the logarithm of that amount.

The distribution change output section 106 reads out at least either the distance computation results 141-144 stored in the distance storage section 140 or the score computation results 161-164 stored in the score storage section 160, and displays those on the display device 180 in a form of graph so that changes in those values in terms of time can be visually recognized (S106). FIG. 4 shows a display example thereof. Here, the change-degree scores of the time-series data shown with Expression 3-Expression 5 are illustrated, and a graph of Expression 6 is omitted.

Referring to FIG. 4, regarding the changes in the entire probability distribution, the score is large at three points, i.e., at time $t_1$, $t_2$, $t_3$. Regarding the changes in the probability distribution of the latent variable, the score is large at two points, i.e., at time $t_1$, $t_3$. Regarding the changes in the conditional probability distribution, the score is large at one point, i.e., at time $t_2$. As described, in the display example as in FIG. 4, it is easy to visually recognize the point at which the entire structure (probability distribution) or a partial structure of the model changes radically.

In the above case, the change-degree scores are displayed. However, the time series data of the distance computation results 141-144 that are the basis of computation may be put into a form of graph and displayed in the same manner. In that case, the time-series data themselves of the distance computation results 141-144 may be displayed as well. Further, it is also possible to find a matrix of the distances between the distributions within a certain time, and the probability distribution at each time may be expressed with a low-dimensional vector by using MDS (multidimensional scaling) or the like. For example, when a mixed distribution is used as a model for learning and a Hellinger distance is used as the distance between the distributions to observe the changes in the entire distributions, the distance matrix to be obtained is as in Expression 9.

$$D(t, t') = \sum_{x=1}^{n} \sum_{y} \left( \sqrt{\gamma_t(x) q_t(y|x)} - \sqrt{\gamma_{t'}(x) q_{t'}(y|x)} \right)^2 \quad \text{(Expression 9)}$$

FIG. 5 shows a display example showing a graph of the changes in the time series data themselves which show the changes in the probability distributions computed by the distribution-to-distribution computing section 103, and FIG. 6 shows a display example which finds a matrix of the distances between the probability distributions within a certain time, and expresses the probability distributions at each time with a low-dimensional vector by using MDS or the like. Both of the graphs regard to one of the plurality of probability distributions. In the display example as in FIG. 5, the change amount itself of the model is displayed. Thereby, in addition to be able to visually recognize the fact whether or not there is a radical change, it is possible to visually recognize the information indicating that the change amount is constantly large or vise versa, for example. Further, in the display example as in FIG. 6, it is possible to observe not the change degree of the probability distribution at each point but the change including the extent of change compared with that of the past.

Next, the change-point detecting section 107 reads out the score computation results 161-164 computed by the change-degree score computing section 105 from the score storage section 160, detects change-points according to a detecting method designated in the condition 121 of the condition storage section 120, and displays the detected result to the display device 180 (S107).

The above-described processing is repeatedly executed until there is no more time-series data 111.

Next, effects of the exemplary embodiment will be described.

The user can recognize the statistical change-point appeared in the time-series data 111 from the detected results displayed on the display device 180.

Further, when there is data in a part of the time-series data 111, which has already been judged whether or not it is the change-point to be detected, the user can conduct a tuning work of the change-point detection processing by using that knowledge. That is, it is possible to change the condition 121 of the condition storage section 120 in such a manner that the change-points to be detected can be detected thoroughly and to have no misdetection.

In a case of handling only the entire probability distribution of the first statistical model, conducted as such tuning work may only be adjustment of the threshold value for being compared to the change-degree scores of the entire probability distribution. However, the exemplary embodiment handles four kinds of probability distributions such as the probability distribution of the first statistical model, the probability distribution of the latent variable as well the conditional probability distribution as a part of the probability distribution of the first statistical model, and the probability distribution obtained by linearly combining those. Therefore, it is possible to conduct a delicate tuning work.

For example, it is assumed that changes at the two points at time $t_1$, $t_3$ among the three points at time $t_1$, $t_2$, $t_3$ are the points to be detected since the changes thereat are abnormal, and the change at the point at time $t_2$ is not to be detected since the change thereat is normal. In that case, with the widely-used technique which detects the change-points by comparing the change-degrees of the entire probability distributions with certain threshold values, it is not possible to detect the change-points at time $t_2$ and $t_3$ distinctively. In the meantime, it is possible with the exemplary embodiment to detect the change-points at time $t_2$ and $t_3$ distinctively, through changing the condition 121 to detect a point at which the change degree of the entire probability distribution is larger than a certain threshold value and the change degree of the probability distribution of the latent variable is larger than a certain threshold value as the change-point, or through changing the condition 121 to set the combination factor $c_3$ to "0" and to detect a point at which the probability distribution obtained by linearly combining the entire probability distribution and the probability distribution of the latent variable actually exceeds a certain threshold value as the change-point.

(Second Exemplary Embodiment)

Referring to FIG. 7, a change-point detecting device according to a second exemplary embodiment of the invention has: a data processor 300 operated by a program control; an input data storage section 310 configured with a magnetic disk, a semiconductor memory, or the like; a condition storage section 320; a first learning result storage section 330; a distance storage section 340; a second learning result storage section 350; a score storage section 360; an input device 370 configured with a keyboard and the like; a display device 380 configured with a liquid crystal display or the like.

The input data storage section 310 stores time-series data 311 that is a target of detecting a change-point. The time-series data 311 may be a discrete-value change amount or a continuous-value change amount, or may also be a mixture of those.

The condition storage section 320 stores a condition 321 of change-point detection processing. In the case of this exemplary embodiment, the condition 321 contains: (a) a combination factor which gives a weight of each probability distribution when linearly combining a plurality of probability distribution; and (b) a change-point detecting condition. The change-point detecting condition sets the way of combining a plurality of kinds of score series, and what kinds of threshold values to be used.

The first learning result storage section 330, the distance storage section 340, the second learning result storage section 350, and the score storage section 360 temporarily store a first learning result 331, distance computation results 341-345, second learning results 351-355, and score computation results 361-365, which are generated in the change-point detection processing executed by the data processor 300, respectively.

The input device 370 receives various setting instructions and data from a user, and inputs those to the data processor 300.

The display device 380 visualizes the data outputted from the data processor 300 and displays it to the user. The display device 380 is used herein as an example of the device for outputting the processed results and the like to the user. However, other kinds of output devices such as a printer may be employed as well.

The data processor 300 detects a statistical change point by analyzing the time-series data 311 stored in the input data storage section 310 according to a setting instruction inputted from the input device 370, and displays the detection result and the data that is in the analyzing process on the display device 380. The data processor 300 has a data input section 301, a first model learning section 302, a distribution-to-distribution distance computing section 303, a second model learning section 304, a change-degree score computing section 305, a distribution change output section 306, a change-point detecting section 307, and a condition input section 308. Theses devices have following functions, respectively.

The data input section 301 receives inputs of the time-series data 311 from the input data storage section 310, and transmits it to the first model learning section 302.

The first model learning section 302 learns the occurrence probability distribution of the time-series data 311 as the first statistical model that is defined by a finite number of variables including a latent variable, and stores the learning result 331 thereof to the storage section 330. The first learning result 331 contains the time-series data of the finite-variable value which defines the first statistical model.

The distribution-to-distribution computing section 303 reads out the learning result 331 of the first statistical model in order from the first learning result storage section 330, computes distances between the probability distributions at different time for each of the probability distributions of the entire first statistical model, a part of the probability distributions, a probability model computed from the first statistical model, and the probability distributions obtained by linearly combining a plurality of those probability distributions, and saves the result to the distance storage section 340 as the data series of the distances between each of the probability distributions. In the case of this exemplary embodiment, the distribution-to-distribution distance computing section 303 generates the data series of following five distances.

(1) Time-series data of results obtained by computing distances between probability distributions at different times for the probability distributions of the entire first statistical model (distance computation result 341).

(2) Time-series data of results obtained by computing the distances between probability distributions at different times for the probability distributions of the latent variable (distance computation result 342).

(3) Time-series data of results obtained by computing the distances between probability distributions at different times for the conditional probability distributions of observed values contingent on the latent-variable value (distance computation result 343).

(4) Time-series data of results obtained by computing the distances between probability distributions at different times for the posteriori probability distributions by using the posteriori probability distributions as the probability distributions computed from the first statistical model (distance computation result 344).

(5) Time-series data of results obtained by computing the distances between probability distributions at different times for the probability distributions obtained by linearly combining the probability distributions of the entire first statistical model, the probability distributions of the latent variable, the conditional probability distributions of the observed values, and the posteriori probability distribution (distance computation result 345). For the combination factors defining the weight of each probability distribution, the combination factors read out from the condition storage section 320 are used.

The second model learning section 304 reads out the distance computation results 341-345 from the distance storage section 340, learns the occurrence probability distributions of the distance data series for each of the distance computation results 341-345 as a second statistical model that is defined by a finite number of variables, and saves the learning results 351-355 thereof to the second learning result storage section 350. Each of the second learning results 351-355 contains the time-series data of the finite-number variable value that defines the second statistical model. The second model learning section 304 and the first model learning section 302 are both the model leaning sections. However, those are different in respect that the first model learning section 302 is the learning section which estimates the probability distribution of the time-series data 311, while the second model learning section 304 is the learning section which finds the change-degree of the estimated probability distribution.

The change-degree score computing section 305 reads out the distance computation results 341-345 from the distance storage section 340, reads out the second learning results 351-355 from the second learning result storage section 350, computes the change-degree scores showing the degrees of shift between the actual distance values and the values expected from the second statistical model for each of the distance data series of each probability distribution, and saves those to the score storage section 360 as the score computation results 361-365. The score computation results 361-365 contain the time-series data of the change-degree score values.

The distribution change output section 306 reads out at least either the distance computation results 341-345 stored in the distance storage section 340 or the score computation results 361-365 stored in the score storage section 360, and displays those on the display device 380 in a form of a graph so that changes in those values in terms of time can be visually recognized.

The change-point detecting section 307 reads out the score computation results 361-365 from the score storage section 360, reads out the change-point detecting condition 321 from the condition storage section 320, detects the change-point appeared in the time-series data of the score computation results 361-365 based on the detecting condition, and displays the detected results on the display device 380.

The condition input section 308 receives the condition 321 of the change-point detection processing from the user via the input device 370 and the display device 380, and saves it to the condition storage section 320.

Next, operations of the change-point detecting apparatus according to the exemplary embodiment will be described.

When the user inputs a change-point detecting instruction from the input device 370, the data processor 300 starts to execute the processing that is the same processing of the flowchart shown in FIG. 2 which shows the operations of the change-point detecting apparatus according to the first exemplary embodiment.

First, the condition input section 308 of the data processor 300 receives an input of the change-point detection processing condition 321 from the user, and saves it to the condition storage section 320 (S101).

FIG. 8 shows an example of a condition setting screen that is displayed on the display device 380 by the condition input section 308. In the drawing, reference numerals 401-404 are input sections of combination factors $c_1$, $c_2$, $c_3$, and $c_4$ when linearly combining a plurality of probability distributions, and "$c_1$" is a weight of the entire probability distribution of the first statistical model, "$c_2$" is a weight of the probability distribution of the latent variable, "$c_3$" is a weight of the conditional probability distribution, and "$c_4$" is a weight of the posteriori probability distribution. Further, reference numerals 405-409 are selecting sections of the score series to be used, 410-414 are input sections of threshold values to be compared with the data of the selected score series, 415, 416 are sections for selecting the combination of a plurality of score series as AND (logical product) or OR (logical sum).

For example, when it is desired to detect the change-point based on the change in the probability distribution obtained by linearly combining the probability distribution of the first statistical model, the probability distribution of the latent variable, the conditional probability distribution of the observed value, and the posteriori probability distribution, the user inputs the values of the combination factors $c_1$, $c_2$, $c_3$ and $c_4$ to input sections 401-404, selects the selection section 409, inputs the threshold value used for judgment to the input section 414, and selects the OR selection section 416. When it is desired to detect a point at which the probability distribution of the first statistical model or the probability distribution of the latent variable exceeds the threshold value as the change-point, the user selects the selection sections 405, 406, inputs the threshold values used for respective judgments to the input sections 410, 411, and selects the OR selection section 416. When it is desired to detect a point at which both the probability distribution of the first statistical model and the probability distribution of the latent variable exceed the threshold value as the change-point, the user selects the selection sections 405, 406, inputs the threshold values used for respective judgments to the input sections 410, 411, and selects the AND selection section 415.

Data inputted via the condition setting screen is saved in the condition storage section 320 by the condition input section 308. The condition setting by the condition input section 308 can be done not only at the start of the change-point detection processing but at any points thereafter. When the condition 321 has already been saved in the condition storage section 320, it is updated to the newly inputted condition.

Then, the first model learning section 302 of the data processor 300 reads out the time-series data 311 in order from the input data storage section 310 via the data input section 301, learns the probability distributions of the time-series data 311 as the statistical model defined by a finite-number of parameters, and saves the first learning result 331 including the values of the learned parameters to the first learning result storage section 330 (S102).

For the statistical models learned by the first model learning section 302, used is a model that includes a latent variable in the finite number of parameters defining the probability distributions. In the exemplary embodiment, a mixed distribution is used. As described in the first exemplary embodiment, in a case of the mixed distribution, the probability distribution $P_t(y)$ of the observed value y at time t is expressed as Expression 2, and the latent variable x shows from which of the distribution among the plurality of distributions the observed value y is generated. Further, the posteriori probability distribution "$p_t(x|y)$" shows the probabilities of y being generated from x (showing from which "x" probably "y" is generated) under such a condition that it is known that y has been observed. The posteriori probability distribution "$p_t(x|y)$" is computed from the learned model as in Expression 10.

$$p_t(x|y) = \gamma_t(x) q_t(y|x) / (\Sigma x \gamma_t(x) q_t(y|x)) \quad \text{(Expression 10)}$$

The first model learning section 302 outputs the learning result for each time t, so that the learning result 331 becomes the time-series data of the learned parameters.

Then, the distribution-to-distribution computing section 303 reads out the first learning result 331 including the parameter learned by the first model learning section 302 from the first learning result storage section 330, computes a moving average of the distances between the probability distributions at different times respectively for the probability distribution $p_t(y)$, one or more probability distributions and the posteriori probability distribution as structural components of the probability distribution $p_t(y)$, and a linearly-combined distribution of those, and stores the time series of the computed values to the distance storage section 340 for each of the probability distributions (S103).

In the case of this exemplary embodiment, the distribution-to-distribution computing section 303 uses two probability distributions, i.e., the probability distribution of the latent variable and the conditional probability distribution of the observed value contingent on the latent-variable value, as the probability distributions to be the structural components of the probability distribution $p_t(y)$. Thus, the exemplary embodiment computes the moving average of the distances between the probability distributions at different times for the four probability distributions (the probability distribution $p_t(y)$, the probability distribution of the latent variable, the conditional probability distribution of the observed value, and the posteriori probability distribution) and the probability distribution obtained by linearly combining those distributions, and stores the time series of the computed values to the distance storage section 340 as the distance computation results 341-345. For the distance between the conditional probability distributions of the observed values, the latent-variable value is the condition. Thus, it is an expected value regarding the latent state of the distance between the conditional probability distributions of the observed values.

As the scale for the distance between the probability distributions, it is possible to use an amount showing a difference between the probability distributions (an amount whose value becomes larger as the difference between the probability distributions becomes larger) such as Hellinger distance or KL information amount.

The second model learning section 304 reads out the distance computation results 341 345 of the distribution-to-distribution computing section 303 from the distance storage section 340, learns each of the probability distributions of the time-series data contained in each of the distance computation results 341-345, respectively, as the second statistical model defined by a finite number of parameters, and stores the second learning results 351-355 containing the values of the learned parameters to the second learning result storage section 350 (S104).

As the second statistical model to be learned, used is a model which describes developments of the time series. For example, it is possible to use an autoregressive model (AR model).

The change-degree score computing section 305 reads out the distance computation results 341-345 computed by the distribution-to-distribution computing section 303 from the distance storage section 340 as well as the second learning results 351-355 of the second model learning section 304 from the second learning result storage section 350, computes the change degree of the probability distribution as the score for each of the probability distribution learned by the second model learning section 304, and saves the score computation results 361-365 to the score storage section 360 (S105).

As the score, used is an amount that shows the shift between the value of the time series and the value that is expected from the learned probability distribution. For example, it is possible to use a logarithmic loss of the learned probability distribution of the value of the time series at each time.

The distribution change output section 306 reads out at least either the distance computation results 341-345 stored in the distance storage section 340 or the score computation results 361-365 stored in the score storage section 360, and displays those on the display device 380 in a form of graph so that changes in those values in terms of time can be visually recognized (S106). Further, instead of displaying the change-degree scores, the time series data of the distance computation results 341-345 that are the basis of computation may be put into a form of graph and displayed in the same manner. In that case, the time-series data themselves of the distance computation results 341-345 may be displayed as well. Further, it is also possible to find a matrix of the distances between the distributions within a certain time, and the probability distributions at each time may be expressed with a low-dimensional vector by using MDS (multidimensional scaling) or the like.

Next, the change-point detecting section 307 reads out the score computation results 361-365 computed by the change-degree score computing section 305 from the score storage section 360, detects change-points according to a detecting method designated in the condition 321 of the condition storage section 320, and displays the detected result to the display device 380 (S107).

The above-described processing is repeatedly executed until there is no more time-series data 311.

Next, effects of the exemplary embodiment will be described.

The user can recognize the statistical change-point appeared in the time-series data 311 from the detected results displayed on the display device 380.

Further, when there is data in a part of the time-series data 311, which has already been judged whether or not it is the change-point to be detected, the user can conduct a tuning work of the change-point detection processing by using that knowledge. That is, it is possible to change the condition 321 of the condition storage section 320 in such a manner that the change-points to be detected can be detected thoroughly and to have no misdetection. In a case of handling only the entire probability distribution of the first statistical model, conducted as such tuning work may only be adjustment of the threshold value for being compared to the change-degree scores of the entire probability distribution. However, the exemplary embodiment handles five kinds of probability distributions such as the probability distribution of the first statistical model, the probability distribution of the latent variable as well the conditional probability distribution as apart of the probability distribution of the first statistical model, the posteriori probability distribution, and the probability distribution obtained by linearly combining those. Therefore, it is possible to conduct a delicate tuning work.

Next, another exemplary embodiment of the invention will be described. A change-point detecting apparatus according to another exemplary embodiment of the invention may be structured to: learn an occurrence probability distribution of data series inputted sequentially as a first statistical model that is defined by a finite number of variables including a latent variable; computes a change degree in the probability distribution in terms of time respectively for the probability distribution of the entire first statistical model, a part of the probability distribution of the first statistical model, and a probability distribution obtained by linearly combining a plurality of those probability distributions; and detects the change-point in the data series based on the computed change-degrees.

A change-point detecting apparatus according to still another exemplary embodiment of the invention may be structured to: learn an occurrence probability distribution of data series inputted sequentially as a first statistical model that is defined by a finite number of variables including a latent variable; computes a change degree in the probability distribution in terms of time respectively for the probability distribution of the entire first statistical model, a part of the probability distribution of the first statistical model, a probability distribution computed from the first statistical model, and a probability distribution obtained by linearly combining a plurality of those probability distributions; and detects the change-point in the data series based on the computed change-degrees.

A change-point detecting apparatus according to yet another exemplary embodiment of the invention may be structured to include: a first model learning section which learns an occurrence probability distribution of data series inputted sequentially as a first statistical model that is defined by a finite number of variables including a latent variable, and saves a learning result thereof; a distribution-to-distribution computing section which reads the learning result obtained by the first learning section, computes distances between probability distributions at different times for each of the probability distribution of the entire first statistical model, a part of the probability distribution of the first statistical model, and a probability distribution obtained by linearly combining a plurality of those probability distributions by using combination factors stored in a condition storage section, and saves results thereof as distance data series by each of the probability distributions; a second model learning section which reads the computation results obtained by the distribution-to-distribution distance computing section, learns an occurrence probability distribution of the data series of each distance as a second statistical model that is defined by a finite number of variables, and saves a learning result thereof; a change-degree score computing section which reads the learning results obtained by the second learning section and the computation results obtained by the distribution-to-distribution distance computing section, computes change-degree scores that show shift between values expected from the second statistical model and the values of the actual distances for each of the data series of the respective distances, and saves the computation results; a distribution-change output section which outputs, from an output device, at least the computation results of the change-degree score computing section or the computation results of the distribution-to-distribution distance computing section; a change-point detecting section which detects a change-point based on the computation result of the change-degree score computing section and a detecting condition stored in the condition storage section, and outputs a detected result from the output device; and a condition input section which saves, in the condition storage section, the detecting condition and the combination factors inputted from an input device.

A change-point detecting apparatus according to yet another exemplary embodiment of the invention may be structured to include: a first model learning section which learns an occurrence probability distribution of data series inputted sequentially as a first statistical model that is defined by a finite number of variables including a latent variable, and saves a learning result thereof; a distribution-to-distribution computing section which reads the learning result obtained by the first learning section, computes distances between probability distributions at different times for each of the probability distribution of the entire first statistical model, a part of the probability distribution of the first statistical model, a probability distribution computed from the first statistical model, and a probability distribution obtained by linearly combining a plurality of those probability distributions by using combination factors stored in a condition storage section, and saves results thereof as distance data series by each of the probability distributions; a second model learning section which reads the computation results obtained by the distribution-to-distribution distance computing section, learns an occurrence probability distribution of the data series of each distance as a second statistical model that is defined by a finite number of variables, and saves a learning result thereof; a change-degree score computing section which reads the learning results obtained by the second learning section and the computation results obtained by the distribution-to-distribution distance computing section, computes change-degree scores that show shift between values expected from the second statistical model and the values of the actual distances for each of the data series of the respective distances, and saves computation results; a distribution-change output section which outputs, from an output device, at least the computation results of the change-degree score computing section or the computation results of the distribution-to-distribution distance computing section; a change-point detecting section which detects a change-point based on the computation results of the change-degree score computing section and a detecting condition stored in the condition storage section, and outputs a detected result from the output device; and a condition input section which saves, in the condition storage section, the detecting condition and the combination factor inputted from an input device.

As a part of the probability distribution of the first statistical model, a probability distribution of a latent variable may be used. As a part of the probability distribution of the first statistical model, a conditional probability distribution of an observed value contingent on the value of the latent variable may be used as well. Further, as the probability distribution computed from the first statistical model, a posteriori probability distribution may be used. Furthermore, the detecting condition may contain designations regarding how and which of the plurality of kinds of change-degree scores obtained for each of the data series of the respective distances to be combined and what kind of threshold value to be used.

A change-point detecting method according to another exemplary embodiment of the invention is a method for detecting a statistical change-point of data series by using a computer, and it may be structured to include: a first step in which the computer learns an occurrence probability distribution of data series inputted sequentially as a first statistical model that is defined by a finite number of variables including a latent variable, and saves a learning result thereof as a first learning result; a second step in which the computer reads the learning result obtained by the first learning section, computes distances between probability distributions at different times for each of the probability distribution of the entire first statistical model, a part of the probability distribution of the first statistical model, and a probability distribution obtained by linearly combining a plurality of those probability distributions by using combination factors stored in a condition storage section, and saves results thereof as distance data series by each of the probability distributions; a third step in which the computer reads the data series of the distance for each of the probability distributions, learns an occurrence probability distribution of the data series of each distance as a second statistical model that is defined by a finite number of variables, and saves a learning result thereof as a second learning result; a fourth step in which the computer reads the second learning result and the data series of the distance of each of the probability distributions, computes change-degree scores that show shift between values expected from the second statistical model and the values of the actual distances for each of the data series of the respective distances, and saves computation results as score computation results; a fifth step in which the computer outputs, from an output device, at least the score computation results or the data series of the distance of each of the probability distributions; a sixth step in which the computer detects a change-point based on the score computation results and a detecting condition stored in the condition storage section, and outputs a detected result from the output device; and a seventh step in which the computer saves, in the condition storage section, the detecting condition and the combination factors inputted from an input device.

A change-point detecting method according to another exemplary embodiment of the invention is a method for detecting a statistical change-point of data series by using a computer, and it may be structured to include: a first step in which the computer learns an occurrence probability distribution of data series inputted sequentially as a first statistical model that is defined by a finite number of variables including a latent variable, and saves a learning result thereof as a first learning result; a second step in which the computer reads the first learning result, computes distances between probability distributions at different times for each of the probability distribution of the entire first statistical model, a part of the probability distribution of the first statistical model, a probability distribution computed from the first statistical model, and a probability distribution obtained by linearly combining a plurality of those probability distributions by using combination factors stored in a condition storage section, and saves results thereof as distance data series by each of the probability distributions; a third step in which the computer reads the data series of the distance for each of the probability distributions, learns an occurrence probability distribution of the data series of each distance as a second statistical model that is defined by a finite number of variables, and saves a learning result thereof as a second learning result; a fourth step in which the computer reads the second learning result and the data series of the distance of each of the probability distributions, computes change-degree scores that show shift between values expected from the second statistical model and the values of the actual distances for each of the data series of the respective distances, and saves computation results as score computation results; a fifth step in which the computer outputs, from an output device, at least the score computation results or the data series of the distance of each of the probability distributions; a sixth step in which the computer detects a change-point based on the score computation results and a detecting condition stored in the condition storage section, and outputs a detected result from the output device; and a seventh step in which the computer saves, in the condition storage section, the detecting condition and the combination factor inputted from an input device.

Further, in the change-point detecting method, a probability distribution of a latent variable may be used as a part of the probability distribution of the first statistical model. As a part of the probability distribution of the first statistical model, a conditional probability distribution of an observed value contingent on the value of the latent variable may be used as well. Further, as the probability distribution computed from the first statistical model, a posteriori probability distribution may be used.

While the embodiments of the present have been described above, the present invention is not limited only to the above-described embodiments. Various kinds of modifications are possible. Further, the functions of the change-point detecting apparatus can be achieved not only by means of hardware but also with a computer and a program. Such program is provided by being recorded to a computer readable recording medium such as a magnetic disk, a semiconductor memory, or the like. The recorded program is read by the computer at the time when the computer is started up or the like to control the operations of the computer, which enables the computer to function as the data input sections 101, 301, the first model learning sections 102, 302, the distribution-to-distribution distance computing sections 103, 303, the second learning sections 104, 304, the change-degree score computing sections 105, 305, the distribution-change output sections 106, 306, the change-point detecting sections 107, 307, and the condition input sections 108, 308 of the above-described embodiments, and also enables the computer to execute the processing described above.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-008027 filed on Jan. 17, 2007, and the disclosure thereof is hereby incorporated by reference in its entirety.

REFERENCE NUMERALS

Figure 1:
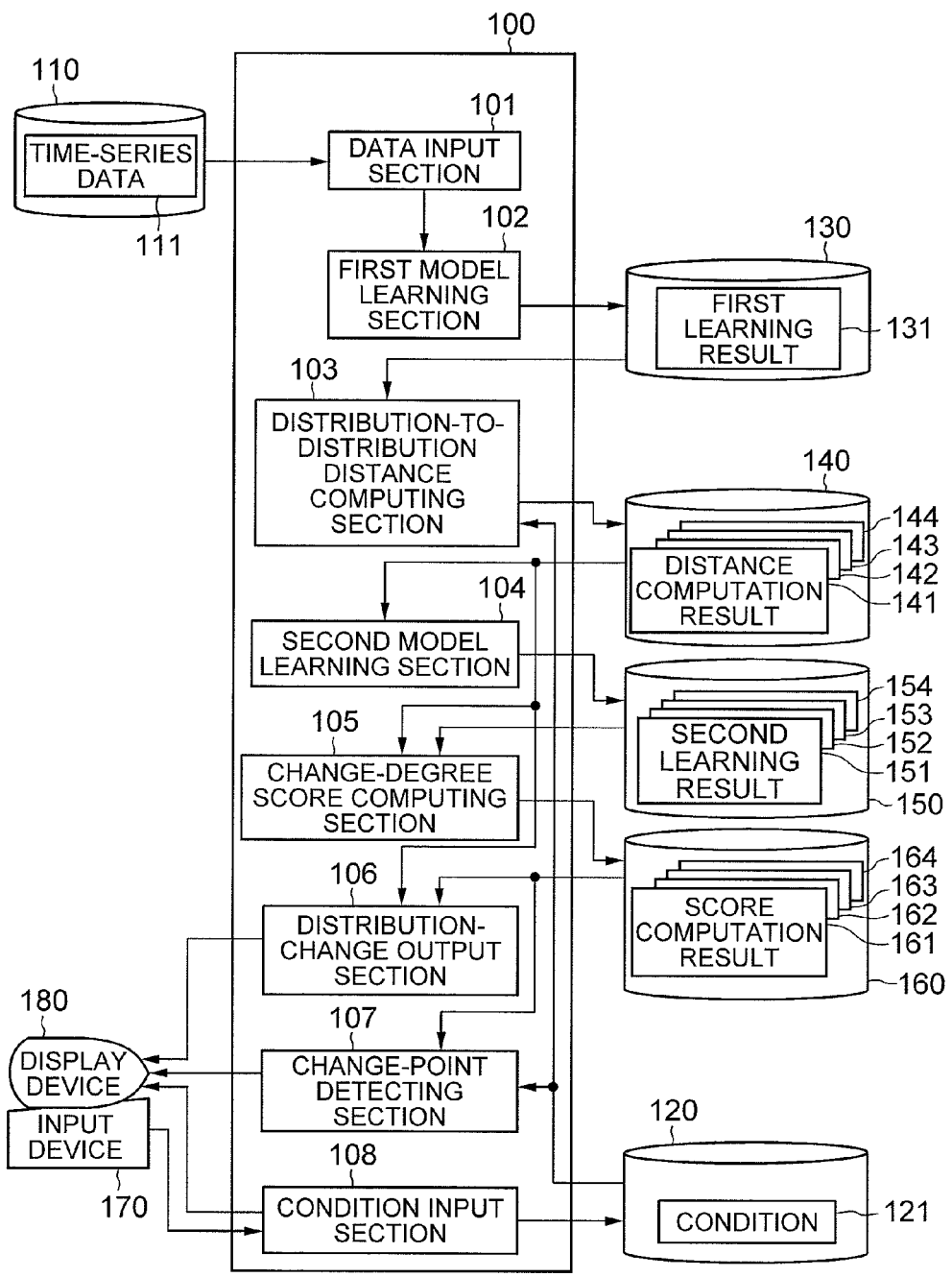
FIG. 1 is a block diagram of a change-point detecting apparatus according to a first exemplary embodiment of the invention.
Figure 2:
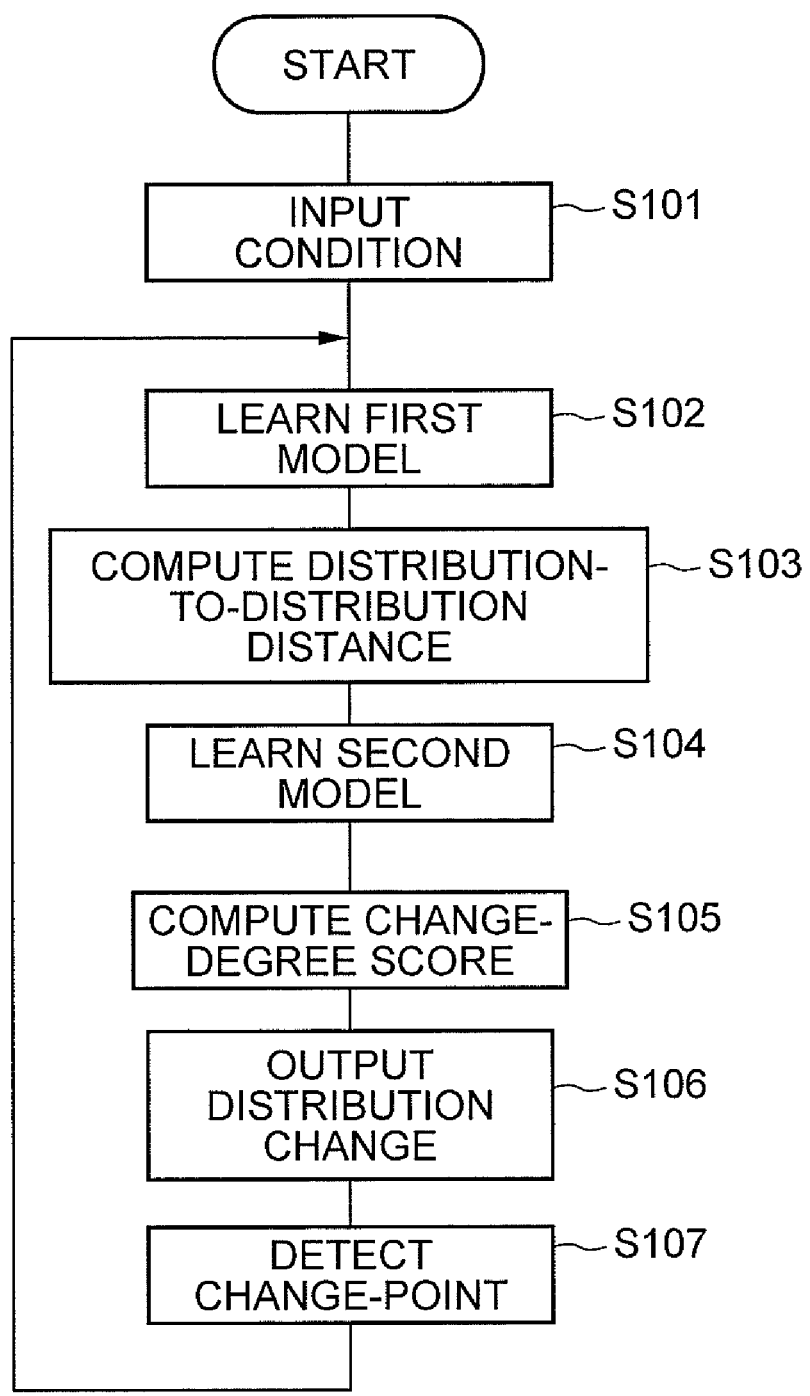
FIG. 2 is a flowchart showing operations of the change-point detecting apparatus according to the first exemplary embodiment of the invention.
Figure 3:
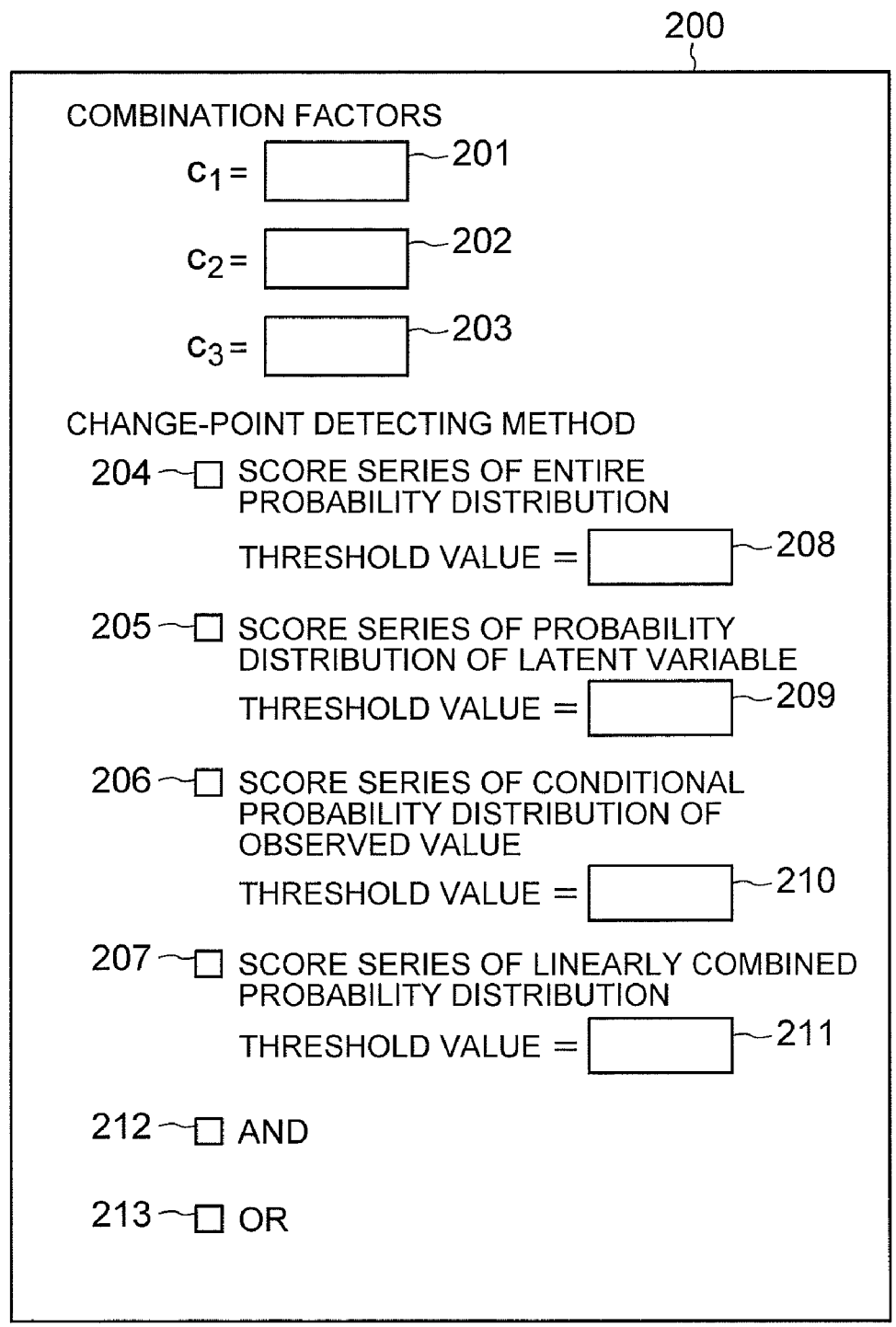
FIG. 3 is an illustration showing an example of a condition setting screen of the change-point detecting apparatus according to the first exemplary embodiment of the invention.
Figure 4:
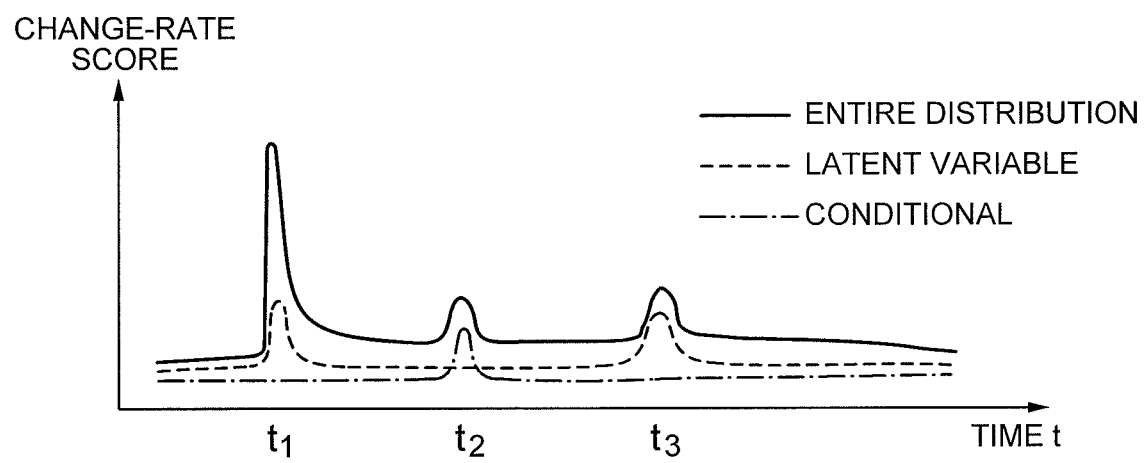
FIG. 4 is a graph showing an example of a change-degree score displayed in the change-point detecting apparatus according to the first exemplary embodiment of the invention.
Figure 5:
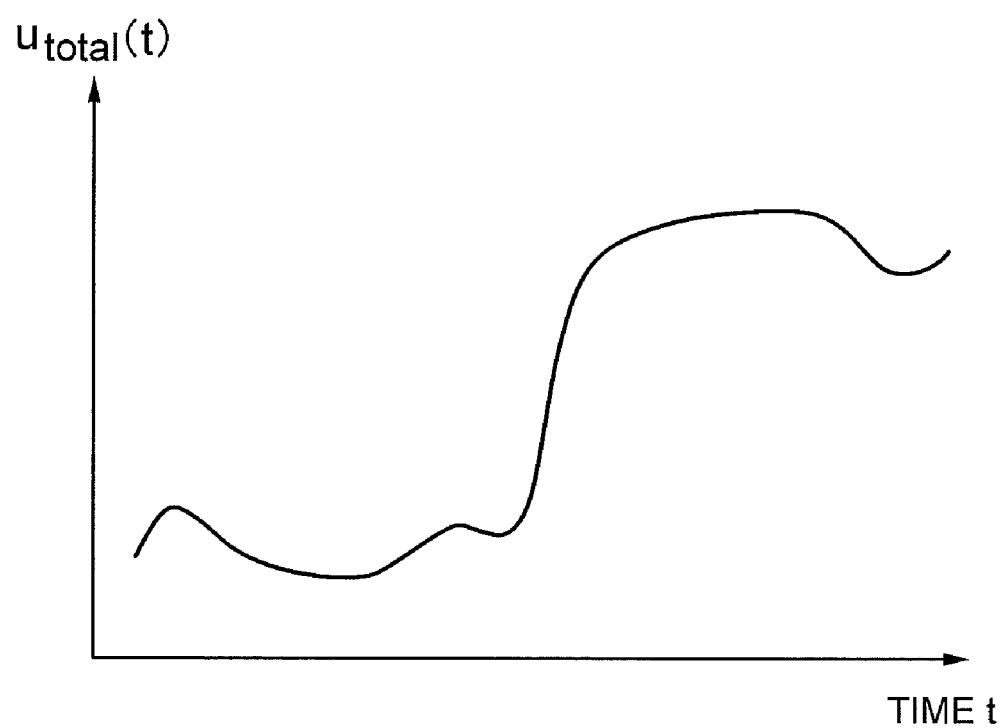
FIG. 5 is a graph showing an example of time-series data which shows changes in a probability distribution displayed in the change-point detecting apparatus according to the first exemplary embodiment of the invention.
Figure 6:
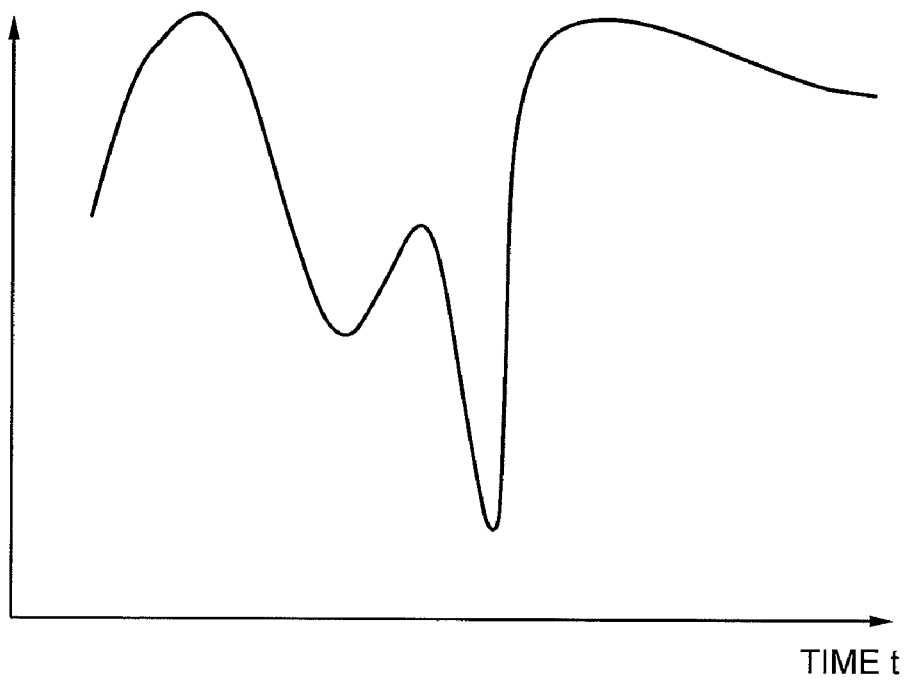
FIG. 6 is a graph showing an example in which a distribution at each time is expressed by a low-dimensional vector by using MDS or the like through obtaining a matrix of distances between probability distributions within a certain time, which is displayed in the change-point detecting apparatus according to the first exemplary embodiment of the invention.
Figure 7:
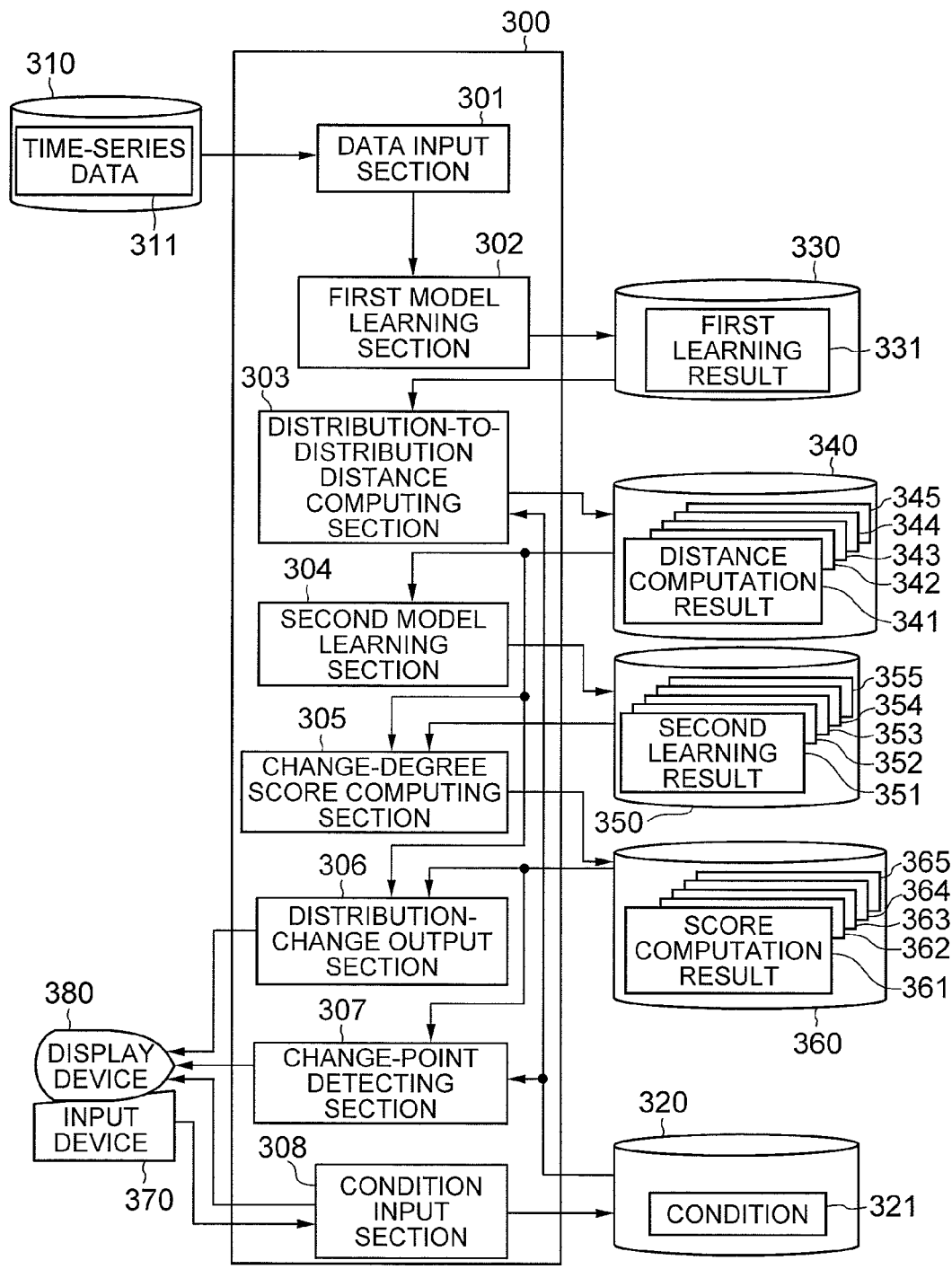
FIG. 7 is a block diagram of a change-point detecting apparatus according to a second exemplary embodiment of the invention.
Figure 8:
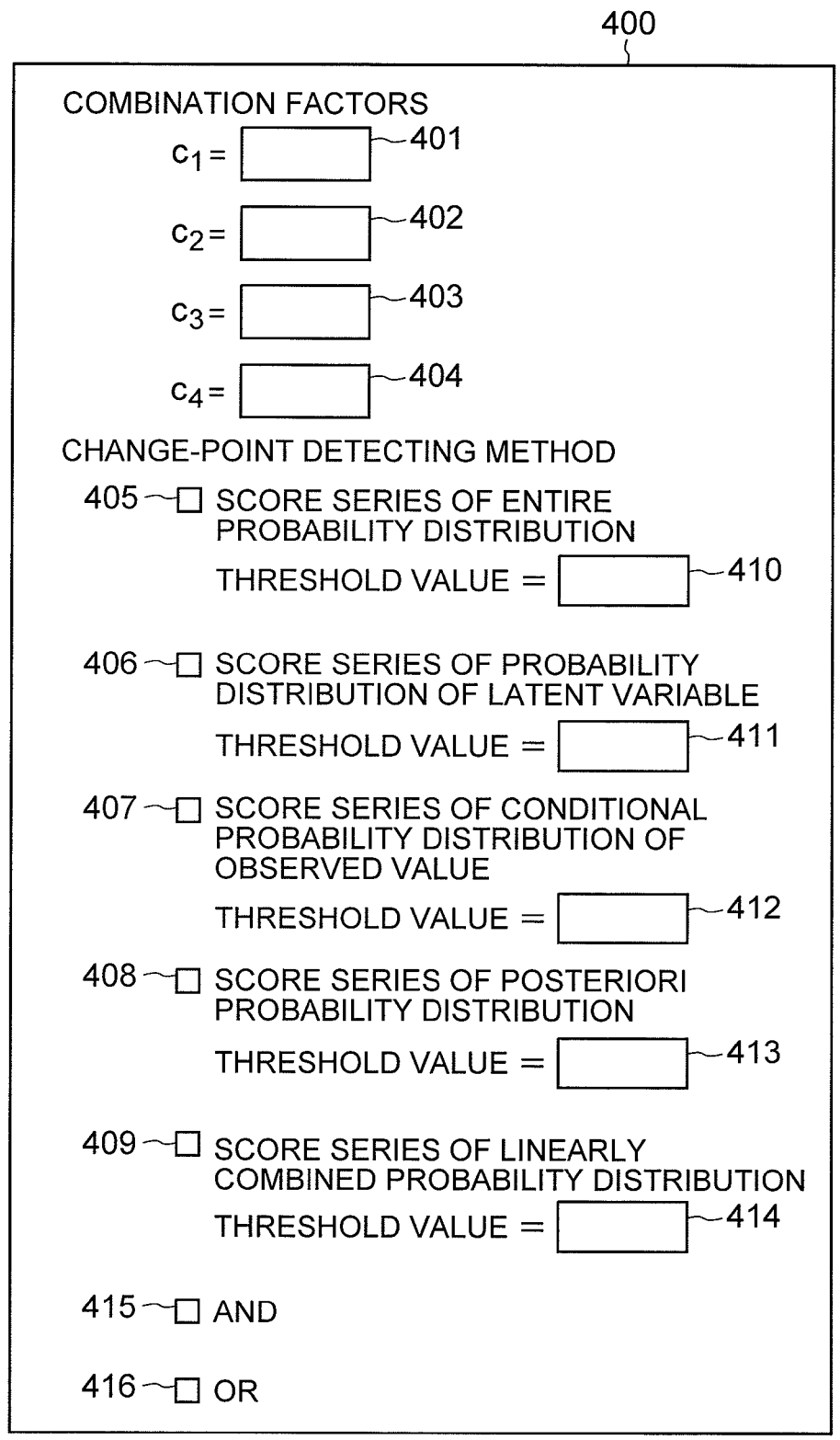
FIG. 8 is an illustration showing an example of a condition setting screen of the change-point detecting apparatus according to the second exemplary embodiment of the invention.

100, 300 Data processor
101, 301 Data input section
102, 302 First model learning section
103, 303 Distribution-to-distribution distance computing section
104, 304 Second model learning section
105, 305 Change-degree score computing section
106, 306 Distribution change-point output section
107, 307 Change-point detecting section
108, 308 Condition input section
110, 310 Input data storage section
111, 311 Time-series data
120, 320 Condition storage section
121, 321 Condition
130, 330 First learning result storage section
131, 331 First learning result
140, 340 Distance storage section
141-144, 341-345 Distance computation result
150, 250 Second learning result storage section
151-154, 351-354 Second learning result
160, 360 Score storage section
161-164, 361-365 Score computation result
170, 370 Input device
180, 380 Display device

The invention claimed is:

1. A change-point detecting apparatus for detecting a statistical change-point of data, comprising:
a processor operable to configure:
a first model learning section which learns an occurrence probability distribution of data as a statistical model that is defined as a mixture of a finite number of distributions containing a latent variable, and estimates a probability distribution of the statistical model, a probability distribution of the latent variable and a conditional probability distribution as a partial distribution thereof;
a second model learning section which learns respective probability distributions of time series data contained in each of a plurality of distance computation results as a second statistical model that is defined by a finite number of parameters;
a change-degree score computing section which computes a change degree in the respective probability distributions as a score for each of the probability distributions learned by the second model learning section; and a change-point detecting section which detects a change-point that appears in the data based on the computed change degree of each of the probability distributions,
wherein each of the plurality of the distance computation results comprises a distance between the probability distributions at different times.

2. The change-point detecting apparatus as claimed in claim 1, wherein the first model learning section estimates not only the probability distributions but also a probability distribution obtained by linearly combining those probability distributions.

3. The change-point detecting apparatus as claimed in claim 1, wherein the first model learning section estimates not only the probability distributions but also a posteriori probability distribution computed from the probability distribution of the statistical model.

4. The change-point detecting apparatus as claimed in claim 3, wherein the first model learning section estimates a probability distribution that is obtained by linearly combining the probability distributions and the posteriori probability distribution.

5. The change-point detecting apparatus as claimed in claim 1, wherein the change-point detecting section detects a point where either the change degree of the probability distribution of the statistical model or the change degree of the probability distribution of the latent variable exceeds its threshold value as the change-point.

6. The change-point detecting apparatus as claimed in claim 1, wherein the change-point detecting section detects a point where both the change degree of the probability distribution of the statistical model and the change degree of the probability distribution of the latent variable exceed their threshold values as the change-point.

7. A change-point detecting method for detecting a statistical change-point of data, comprising:
learning an occurrence probability distribution of data as a statistical model that is defined as a mixture of a finite number of distributions containing a latent variable, and estimating a probability distribution of the statistical model, a probability distribution of the latent variable and a conditional probability distribution as a part of the probability distribution of the statistical model;
learning respective probability distributions of time series data contained in each of a plurality of distance computation result results as a second statistical model that is defined by a finite number of parameters;
computing a change degree in the respective probability distributions as a score for each of the learned probability distributions;
finding the change degree for each of the estimated probability distributions; and
detecting a change-point that appears in the data based on the computed change degree of each of the probability distributions,
wherein each of the plurality of the distance computation results comprises a distance between the probability distributions at different times.

8. The change-point detecting method as claimed in claim 7, which estimates not only the probability distributions but also a probability distribution obtained by linearly combining those probability distributions.

9. The change-point detecting method as claimed in claim 7, which estimates not only the probability distributions but also a posteriori probability distribution computed from the probability distribution of the statistical model.

10. The change-point detecting method as claimed in claim 9, which estimates a probability distribution that is obtained by linearly combining the probability distributions and the posteriori probability distribution.

11. The change-point detecting method as claimed in claim 7, which detects a point where either the change degree of the probability distribution of the statistical model or the change degree of the probability distribution of the latent variable exceeds its threshold value as the change-point.

12. The change-point detecting method as claimed in claim 7, which detects a point where both the change degree of the probability distribution of the statistical model and the change degree of the probability distribution of the latent variable exceed their threshold values as the change-point.

13. A non-transitory computer readable recording medium storing a change-point detecting program for detecting a statistical change-point of data, which enables a computer to execute:
a function which learns an occurrence probability distribution of data as a statistical model that is defined as a mixture of a finite number of distributions containing a latent variable, and estimates a probability distribution of the statistical model, a probability distribution of the latent variable and a conditional probability distribution as a part of the probability distribution of the statistical model;
a function which learns respective probability distributions of time series data contained in each of a plurality of distance computation results as a second statistical model that is defined by a finite number of parameters;
a function which computes a change degree in the respective probability distributions as a score for each of the learned probability distributions learned by the second model learning section;
a function which finds the change degree for each of the estimated probability distributions; and
a function which detects a change-point that appears in the data based on the computed change degree of each of the probability distributions, wherein each of the plurality of the distance computation results comprises a distance between the probability distributions at different times.

14. The non-transitory computer readable recording medium storing the change-point detecting program as claimed in claim 13, which enables the computer to execute a function which estimates not only the probability distributions but also a probability distribution obtained by linearly combining those probability distributions.

15. The non-transitory computer readable recording medium storing the change-point detecting program as claimed in claim 13, which enables the computer to execute a function which estimates not only the probability distributions but also a posteriori probability distribution computed from the probability distribution of the statistical model.

16. The non-transitory computer readable recording medium storing the change-point detecting program as claimed in claim 15, which enables the computer to execute a function which estimates a probability distribution that is obtained by linearly combining the probability distributions and the posteriori probability distribution.

17. The non-transitory computer readable recording medium storing the change-point detecting program as claimed in claim 13, which enables the computer to execute a function which detects a point where either the change degree of the probability distribution of the statistical model or the change degree of the probability distribution of the latent variable exceeds its threshold value as the change-point.

18. The non-transitory computer readable recording medium storing the change-point detecting program as claimed in claim 13, which enables the computer to execute a function which detects a point where both the change degree of the probability distribution of the statistical model and the change degree of the probability distribution of the latent variable exceed their threshold values as the change-point.

19. Change-point detecting means for detecting a statistical change-point of data, comprising:
   first model learning means for learning an occurrence probability distribution of data as a statistical model that is defined as a mixture of a finite number of distributions containing a latent variable, and estimating a probability distribution of the statistical model, a probability distribution of the latent variable and a conditional probability distribution as a partial distribution thereof;
   second model learning means for learning respective probability distributions of time series data contained in each of a plurality of distance computation results as a second statistical model that is defined by a finite number of parameters;
   change-degree score computing means for computing a change degree in the respective probability distributions as a score for each of the probability distributions learned by the second model learning means; and
   change-point detecting means for detecting a change-point that appears in the data based on the computed change degree of each of the probability distributions,
   wherein each of the plurality of the distance computation results comprises a distance between the probability distributions at different times.

* * * * *

UNITED STATES PATENT AND TRADEMARK OFFICE
CERTIFICATE OF CORRECTION

PATENT NO. : 8,250,005 B2
APPLICATION NO. : 12/523412
DATED : August 21, 2012
INVENTOR(S) : Shunsuke Hirose and Kenji Yamanishi It is certified that error appears in the above-identified patent and that said Letters Patent is hereby corrected as shown below:

In the Specification

Column 1-2, Line 61-67 (Col. 1) and 1-9 (Col. 2): Delete "In order to achieve the foregoing object, the change-point detecting apparatus according to the present invention is a change-point detecting apparatus for detecting a statistical change-point of data. The change-point detecting apparatus includes: a first model learning section which learns an occurrence probability distribution of data as a statistical model that is defined by a finite number of modifications containing a latent variable, and estimates a probability distribution of the statistical model, a probability distribution of a latent variable and a conditional probability distribution as a partial distribution thereof; a second model learning section which finds a change degree for each of the estimated probability distributions; and a change-point detecting section which detects a change-point appeared in the data based on the obtained change degrees of each of the probability distributions."

and insert -- In order to achieve the foregoing object, the change-point detecting apparatus according to the present invention is a change-point detecting apparatus for detecting a statistical change-point of data. The change-point detecting apparatus comprises: a first model learning section which learns an occurrence probability distribution of data as a statistical model that is defined as a mixture of a finite number of distributions containing a latent variable, and estimates a probability distribution of the statistical model, a probability distribution of a latent variable and a conditional probability distribution as a partial distribution thereof; a second model learning section which learns respective probability distributions of time series data contained in each distance computation result as a second statistical model that is defined by a finite number of parameters; a change-degree score computing section which computes a change degree in the respective probability distributions as a score for each of the probability distributions learned by the second model learning section; and a change-point detecting section which detects a change-point appeared in the data based on the obtained change degrees of each of the probability distributions. --

Column 2, Line 10-22: Delete "The change-point detecting method according to the present invention is a change-point detecting method for detecting a statistical change-point of data. The change-point Signed and Sealed this
Twenty-first Day of October, 2014

Michelle K. Lee
*Deputy Director of the United States Patent and Trademark Office* detecting method includes: learning an occurrence probability distribution of data as a statistical model that is defined by a finite number of modifications containing a latent variable, and estimating a probability distribution of the statistical model, a probability distribution of a latent variable and a conditional probability distribution as a partial distribution thereof; finding a change degree for each of the estimated probability distributions; and detecting a change-point appeared in the data based on the obtained change degrees of each of the probability distributions."

and insert -- The change-point detecting method according to the present invention is a change-point detecting method for detecting a statistical change-point of data. The change-point detecting method comprises: learning an occurrence probability distribution of data as a statistical model that is defined as a mixture of a finite number of distributions containing a latent variable; estimating a probability distribution of the statistical model, a probability distribution of the latent variable and a conditional probability distribution as a part of the probability distribution of the statistical model; learning respective probability distributions of time series data contained in each distance computation result as a second statistical model that is defined by a finite number of parameters; computing a change degree in the respective probability distributions as a score for each of the learned probability distributions; finding the change degree for each of the estimated probability distributions; and detecting a change-point appeared in the data based on the obtained change degrees of each of the probability distributions. --

Column 2, Line 23-36: Delete "The change-point detecting program according to the present invention is a change-point detecting program for detecting a statistical change-point of data. The change-point detecting program enables a computer to execute: a function which learns an occurrence probability distribution of data as a statistical model that is defined by a finite number of modifications containing a latent variable, and estimates a probability distribution of the statistical model, a probability distribution of a latent variable and a conditional probability distribution as a partial distribution thereof; a function which finds a change degree for each of the estimated probability distributions; and a function which detects a change-point appeared in the data based on the obtained change degrees of each of the probability distributions."

and insert -- The change-point detecting program according to the present invention is a change-point detecting program for detecting a statistical change-point of data. The change-point detecting program enables a computer to execute: a function which learns an occurrence probability distribution of data as a statistical model that is defined as a mixture of a finite number of distributions containing a latent variable, and estimates a probability distribution of the statistical model, a probability distribution of the latent variable and a conditional probability distribution as a part of the probability distribution of the statistical model; a function which learns respective probability distributions of time series data contained in each distance computation result as a second statistical model that is defined by a finite number of parameters; a function which computes a change degree in the respective probability distributions as a score for each of the learned probability distributions learned by the second model learning section; a function which finds the change degree for each of the estimated probability distributions; and a function which detects a change-point appeared in the data based on the obtained change degrees of each of the probability distributions. --

CERTIFICATE OF CORRECTION (continued)
U.S. Pat. No. 8,250,005 B2

Column 2, Line 37-59: Delete "(Effects) The function showing the occurrence probability distribution learned as the first statistic model defined by a finite number of variables including a latent variable can be separated into a part regarding the latent variable and a part other than that part. In terms of the probability distribution, a function part regarding the latent variable shows the probability distribution of the latent variable, and the other function part shows a conditional probability distribution contingent on the value of the latent variable. When the change degree of the probability distribution of the latent variable, the change degree of the conditional probability distribution, and the change degree of the linearly combined probability distribution of those plurality of probability distributions with a weight are calculated and used for detection of the change-point in addition to using the change degree of the entire original probability distribution, it is possible to set the detecting condition more delicately than the case of detecting the change-point based only on the change degree of the entire probability distribution. Further, when a posteriori probability distribution is used further as the probability distribution calculated from the first statistic model, the detecting condition can be set in a still more delicate manner."

and insert -- (Effects) The function showing the occurrence probability distribution learned as the first statistical model that is defined as a mixture of a finite number of distributions containing a latent variable can be separated into a part regarding the latent variable and a part other than that part. In terms of the probability distribution, a function part regarding the latent variable shows the probability distribution of the latent variable, and the other function part shows a conditional probability distribution contingent on the value of the latent variable. When the change degree of the probability distribution of the latent variable, the change degree of the conditional probability distribution, and the change degree of the linearly combined probability distribution of those plurality of probability distributions with a weight are calculated and used for detection of the change-point in addition to using the change degree of the entire original probability distribution, it is possible to set the detecting condition more delicately than the case of detecting the change-point based only on the change degree of the entire probability distribution. Further, when a posteriori probability distribution is used further as the probability distribution calculated from the first statistic model, the detecting condition can be set in a still more delicate manner. --